(12) United States Patent
Scherpa et al.

(10) Patent No.: US 8,612,867 B2
(45) Date of Patent: Dec. 17, 2013

(54) EMBEDDING TOOLS IN A COLLABORATION WINDOW

(75) Inventors: Josef Scherpa, Fort Collins, CO (US); Andrew L. Schirmer, Andover, MA (US)

(73) Assignee: Intellectual Business Machines Corporation, Armonk, NY (US)

( * ) Notice: Subject to any disclaimer, the term of this patent is extended or adjusted under 35 U.S.C. 154(b) by 482 days.

(21) Appl. No.: 12/946,548

(22) Filed: Nov. 15, 2010

(65) Prior Publication Data

US 2012/0124485 A1 May 17, 2012

(51) Int. Cl.
G06F 3/00 (2006.01)
G06F 7/00 (2006.01)

(52) U.S. Cl.
USPC .......................................... 715/751; 707/769

(58) Field of Classification Search
USPC ........................... 715/751, 753, 758; 707/769
See application file for complete search history.

(56) References Cited

U.S. PATENT DOCUMENTS

| 5,572,648 | A | 11/1996 | Bibayan |
| 7,702,798 | B2 | 4/2010 | Apreutesei et al. |
| 2001/0051982 | A1 | 12/2001 | Graziani |
| 2004/0186721 | A1 | 9/2004 | Beynon et al. |
| 2005/0132298 | A1* | 6/2005 | Lueckhoff et al. ............ 715/758 |
| 2006/0129979 | A1 | 6/2006 | Fernando et al. |
| 2006/0224722 | A1 | 10/2006 | McGowan et al. |
| 2008/0228890 | A1 | 9/2008 | George et al. |
| 2009/0019120 | A1 | 1/2009 | Muguda |
| 2009/0076871 | A1* | 3/2009 | Heacock ........................... 705/8 |
| 2009/0150499 | A1 | 6/2009 | Partridge et al. |
| 2009/0276400 | A1* | 11/2009 | Jaffer et al. ....................... 707/3 |
| 2009/0282106 | A1* | 11/2009 | Jaffer et al. ................... 709/206 |
| 2009/0282421 | A1* | 11/2009 | Jaffer et al. ................... 719/317 |
| 2010/0218119 | A1 | 8/2010 | Scott |
| 2012/0072440 | A1* | 3/2012 | Vasquez et al. ............... 707/769 |

OTHER PUBLICATIONS

IBM, "Dynamic Application Feature Set Loading, Depending Upon Runtime System Resource Availability", IP.com No. IPCOM000190730D, Dec. 9, 2009.

IBM, "System and method for integration of Instant Messaging application (s) and J2EE web application(s)", IP.com No. IPCOM000180186D, Mar. 5, 2009.

"Introducing the Sametime Client Toolkits", A Lotus Software White Paper, Jun. 2003, http://www-12.1otus.com/Idd/doc/uafiles.nsf/70817c90542892178525695b005110 5c/08cf846e9c2.

* cited by examiner

*Primary Examiner* — Rashawn Tillery
(74) *Attorney, Agent, or Firm* — Law Office of Jim Boice

(57) ABSTRACT

A computer implemented method, system and/or computer program product automatically extends a collaboration window. An initiation of an interactive teleconference, which utilizes a collaboration window that is displayed on two communication devices, is detected. The topic of the interactive teleconference is determined by a starting context of the interactive teleconference. The topic is associated with a related application that provides supporting information for the interactive teleconference. This supporting information and/or associated application(s) are then displayed on one or both of the two communication devices.

20 Claims, 5 Drawing Sheets

300

Customer X on Mobile Phone – 555-555-xxxx

Name, number or content

Customer X — 9:01 am
I don't know why my order was cancelled. Could you take a look?

Broker Y — 9:02 am
Hello, Customer X. I am reviewing your trading history now.

Customer X — 9:02 am
Thanks. Let me know what I need to do. I want to get some shares for my IRA account

Broker Y — 9:02 am
Ok, I found the trade. You marked it to expire by the end of the day. Since it was a limit order, and the price was not met, the trade was canceled at the end of the day ——— Broker Y is typing . . . ———

302

Trading History

| Event | Amount | Date |
|---|---|---|
| BUY (XXX) | 5,500.00 | 09/01/20 |
| SELL (ABC) | 150.00 | 09/01/20 |
| SELL (XXX) | CANCELLED | 08/31/20 |
| STOCK | XXX | |
| PRICE | 120.48 | |
| TYPE | LIMIT | |
| EXPIRATION: | DAY | |
| STATUS: | EXPIRED | |
| DEPOSIT | 8,500.00 | 08/10/20 |
| WITHDRAWAL | 500.00 | 08/08/20 |
| WITHDRAWAL | 600.00 | 08/01/20 |

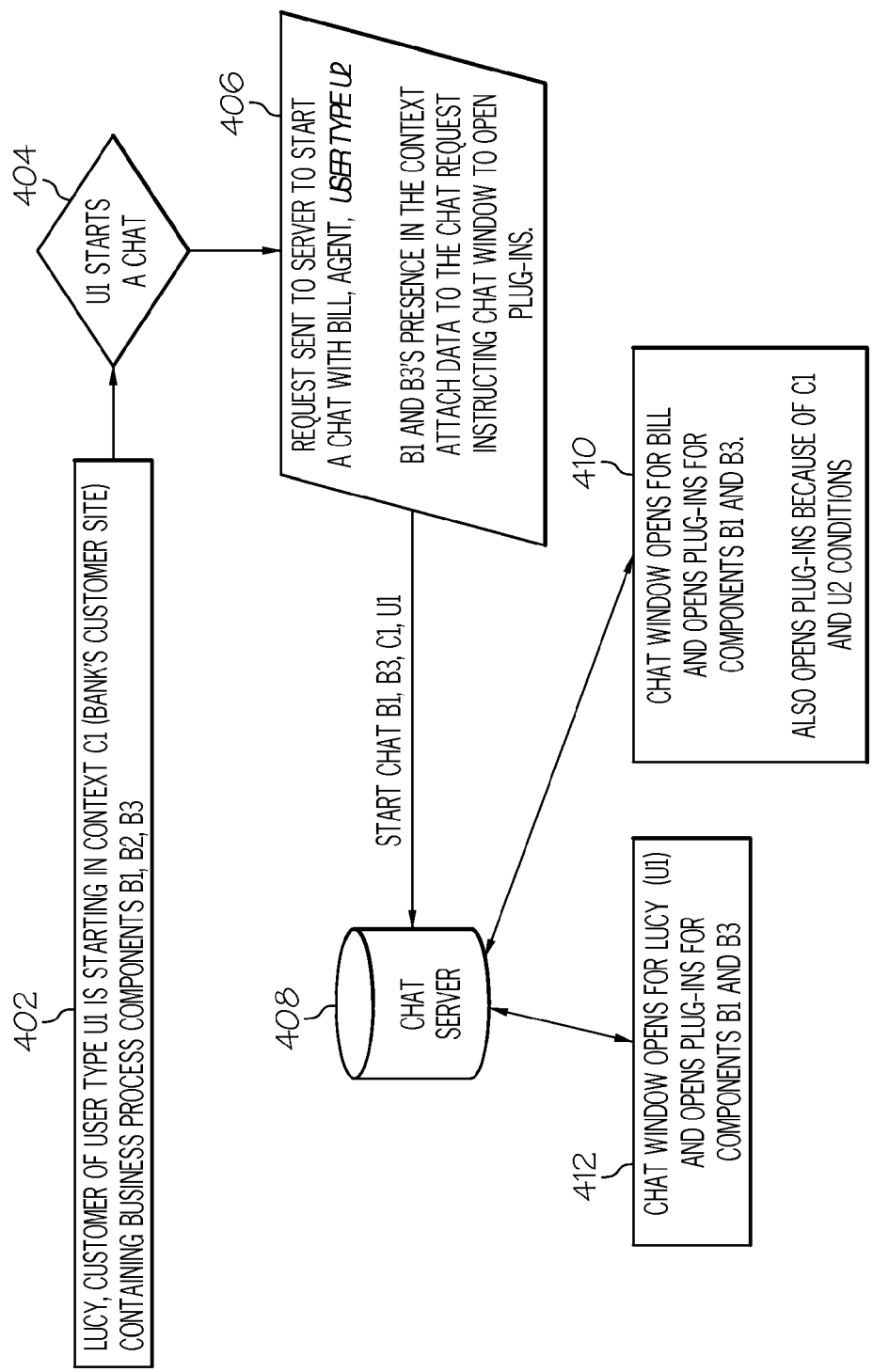

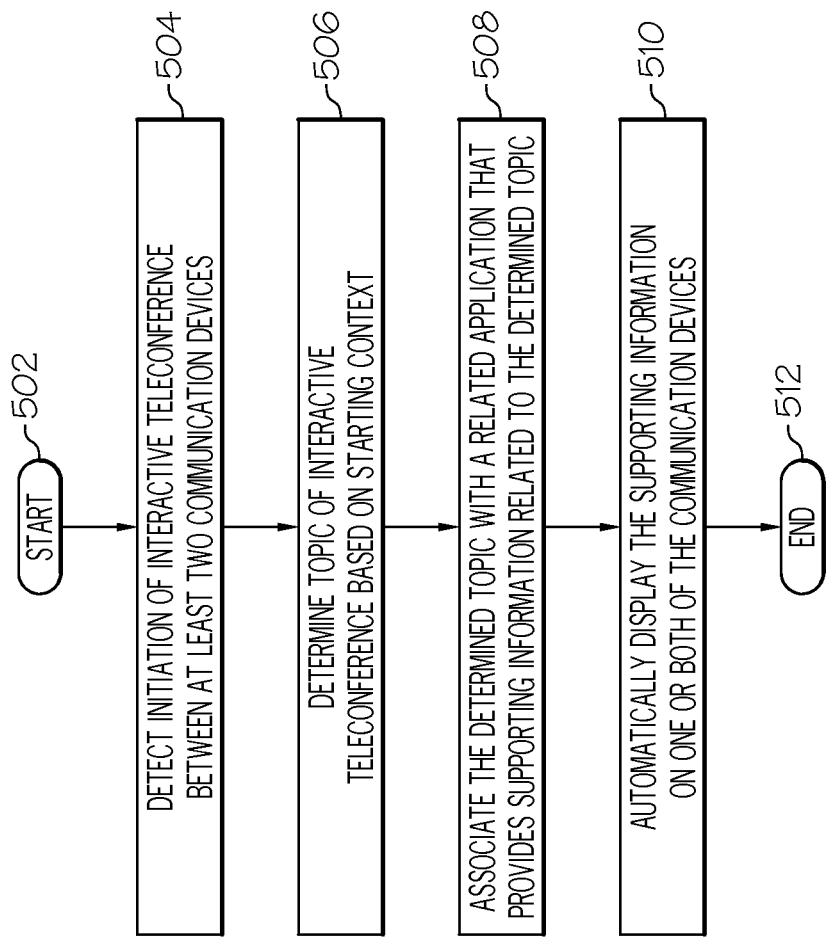

EMBEDDING TOOLS IN A COLLABORATION WINDOW

BACKGROUND

The present disclosure relates to the field of computers, and specifically to computers that support communication between users. Still more particularly, the present disclosure relates to collaborative applications used by communicating computers.

Networked computers provide users with the ability to communicate and interact, particularly during business-to-business and business-to-customer sessions. Typically, information, including that found in collaboration windows, is exchanged between users of the networked computers by user inputs of information needed during the session, such as the session topic, a user's identification number, etc.

BRIEF SUMMARY

A computer implemented method, system and/or computer program product automatically extends a collaboration window. An initiation of an interactive teleconference, which utilizes a collaboration window that is displayed on two communication devices, is detected. The topic of the interactive teleconference is determined by a starting context of the interactive teleconference. The topic is associated with a related application that provides supporting information for the interactive teleconference. This supporting information and/or associated application(s) are then displayed on one or both of the two communication devices.

BRIEF DESCRIPTION OF THE SEVERAL VIEWS OF THE DRAWINGS

FIG. 3 is an exemplary User Interface (UI) used in one embodiment of the present disclosure;

FIG. 4 is a high level description of the use of, and interactions among, contexts and business process components used in one embodiment of the present disclosure; and FIG. 5 is a flow chart of one or more exemplary steps taken by a computer/processor to automatically extend a collaboration window.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
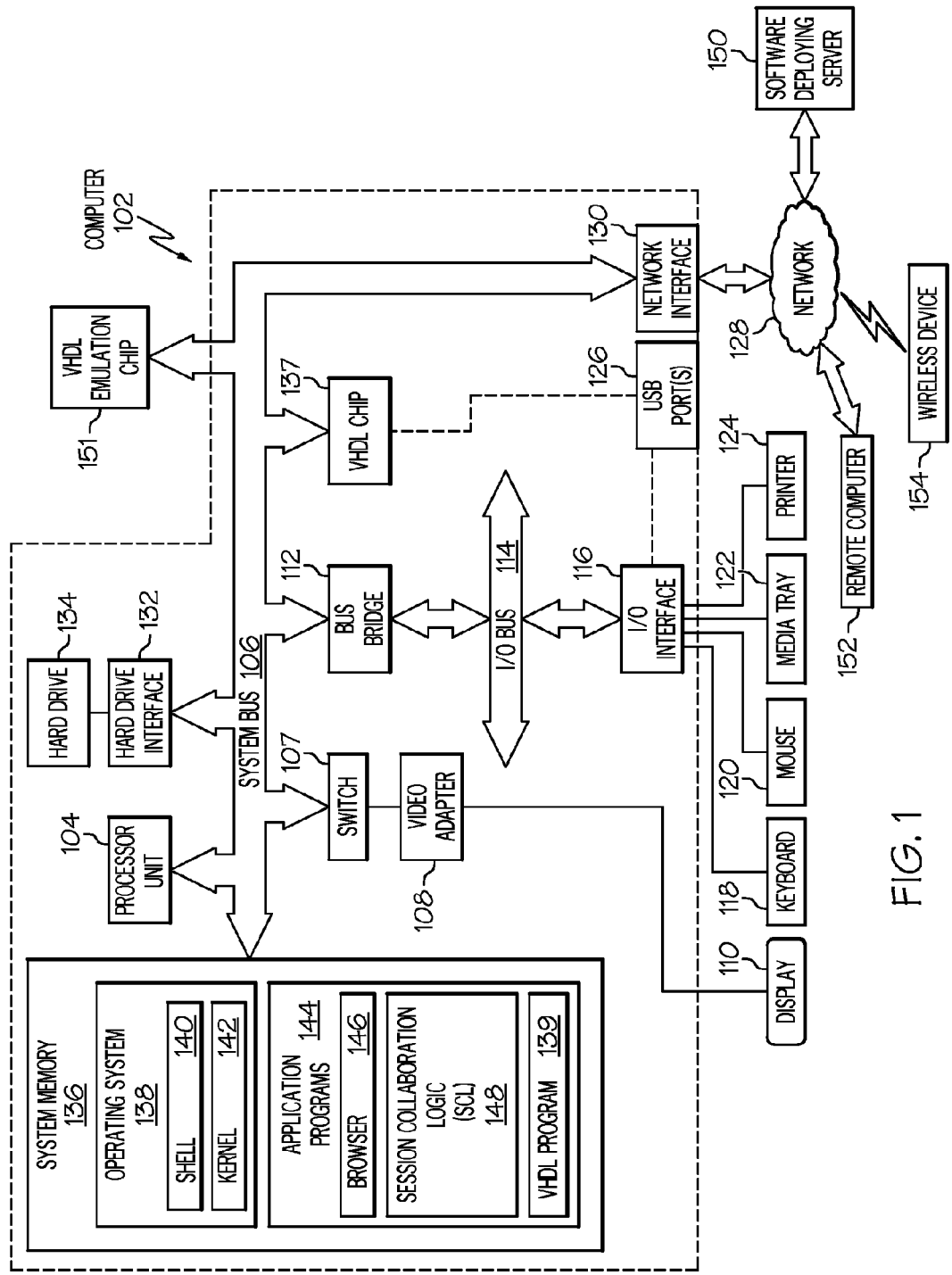
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150, remote computer 152, and/or wireless device 154.

Computer 102 includes a processor unit 104 that is coupled to a system bus 106. Processor unit 104 utilizes one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, which may be mechanical, that allows the display 110 to be coupled to the system bus 106, and thus to be functional only upon execution of instructions (e.g., Session Collaboration Logic—SCL 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or remote computer 152 via network 128 using a network interface 130. Network 128 may be an external network such as the Internet, an internal network such as an Ethernet or a virtual private network (VPN), or a wireless network.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a Session Collaboration Logic (SCL) 148. SCL 148 includes code for implementing the processes described below, including those described in FIGS. 2-5. In one embodiment, computer 102 is able to download SCL 148 from software deploying server 150, including in an on-demand basis, such that the code from SCL 148 is not downloaded until runtime or otherwise immediately needed by computer 102. Note further that, in one embodiment of the present disclosure, software deploying server 150 performs all of the functions associated with the present disclosure (including execution of SCL 148), thus freeing computer 102 from having to use its own internal computing resources to execute SCL 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from SCL 148 causes VHDL program 139 to configure VHDL chip 137, which may be an FPGA, ASIC, etc.

In another embodiment of the present disclosure, execution of instructions from SCL 148 results in a utilization of VHDL program 139 to program a VHDL emulation chip 151. VHDL emulation chip 151 may incorporate a similar architecture as described above for VHDL chip 137. Once SCL 148 and VHDL program 139 program VHDL emulation chip 151, VHDL emulation chip 151 performs, as hardware, some or all functions described by one or more executions of some or all of the instructions found in SCL 148. That is, the VHDL emulation chip 151 is a hardware emulation of some or all of the software instructions found in SCL 148. In one embodiment, VHDL emulation chip 151 is a programmable read only memory (PROM) that, once burned in accordance with instructions from SCL 148 and VHDL program 139, is permanently transformed into a new circuitry that performs the functions needed to perform the process described below in FIGS. 2-5.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

In one embodiment, there are two main components to the present disclosure. The first component is a collaboration interface capable of displaying one or more application panels out of a set of installed extension applications. The second component is a data transport channel added to the current mechanisms for initiating a collaboration event, to which a business process or application can add context specific data which directs the collaboration interface to open with additional business process extension panels, as well as to pass data directly into those additional panels.

By utilizing these two main components, in one embodiment the present disclosure is directed to a collaborative session between remote communication/computing devices. That is, business processes often require real time collaboration. For example, a bank may allow customers to start a chat via the bank's website in order to get help from a bank agent in real time via a chat window. As described herein, the present disclosure enables such chat windows to be extended based on a starting context, such that an application or business process includes instructions for opening specific application extension panels inside of a collaboration interface. This application extension can also pass data from the starting context that interacts with the opened extension panels. For example, a user could be looking at a list of insurance claims, each with an associated agent. Upon clicking an action associated with the agent name, a chat window opens along with an embedded third party application panel to support insurance claim data entry as well as providing additional info about the claim. Utilizing the present disclosure, no additional work is needed by either participant to open the related application in the chat window to collaborate about this particular object in the starting business application.

Another example of the chat environment for brokerage agents is as follows. Assume that a customer initiates a chat from a brokerage website. The brokerage agent receives a chat request and opens the chat window, which also includes transaction panels pertaining to the customer who started the chat. That same brokerage agent may also receive a chat request from an internal brokerage human resources agent, started from an HR application, which triggers the chat window with that agent to display an application inside the chat window related to HR data. In both of these chat windows, only the appropriate business application is included in the chat window due to the starting point from which the initiator launched the chat.

Figure 2:
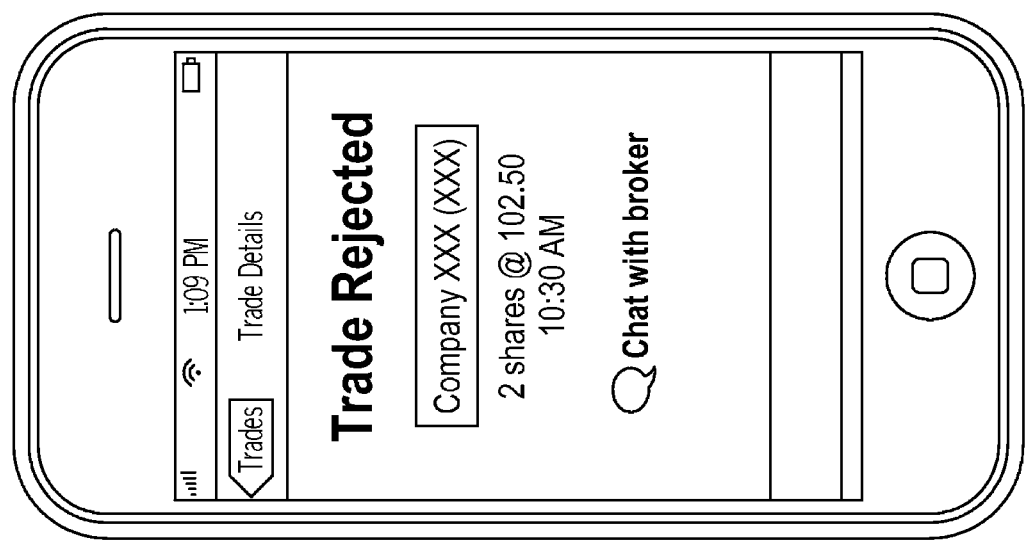
FIG. 2 illustrates an exemplary mobile communication device used in one embodiment of the present disclosure.

For example, consider the exemplary scenario shown in FIGS. 2-3. Using a mobile device, such as the smart phone 200 (e.g., wireless device 154 depicted in FIG. 1), as shown in FIG. 2, a brokerage customer on a mobile brokerage application starts a chat with a brokerage agent. This causes the brokerage agent's chat window to automatically open and display a transaction application along with the chat, as shown in the brokerage agent's user interface 300 (e.g., display 110 depicted in FIG. 1), as shown in FIG. 3. The transaction application is one of multiple applications that are automatically and selectively opened (or not opened) depending on the starting context. In this example, since the context of the chat session was related to an error that resulted from a stock transaction request (shown in FIG. 2), then the application 302 automatically populates the UI 300 on which the chat window 304 is residing.

Thus, the present disclosure presents a collaboration system in which contexts preceding an electronic collaboration cause one or more "plug-in" windows supplying additional functionality to be added to the collaboration, and optionally passing data to said plug-ins. Contexts may include one or more identities of the participants and/or information being exchanged through the collaboration.

With reference now to FIG. 4, consider the following exemplary scenario that provides information about a potential architectural flow, in one embodiment of the present disclosure. Assume that "Lucy" is a bank customer who needs to chat about her recent transactions, when viewing her checking account history on the bank website (block 402). Thus, Lucy starts a chat session (block 404). Lucy is a user identified as a user type U1 (customer) according to her identifier, what type of website she is using (e.g., a "customer help" website), whether she is behind or outside of a firewall or other enterprise internal system, etc. The context of the chat session is that she is a customer who is making an online inquiry, from a website, about her bank checking account history (C1). Business process components B1, B2, and B3 are various business applications (e.g., applications that provide relevant information about customer's transactions, customer information, security information, history, etc.) that are available to the bank agent. As such, business process components B1 and B3 have associated chat window plug-ins (block 406). "Bill" is a bank agent who helps many different customers chat about various banking issues, through the use of a chat server (element 408). Bill is a user identified as user type U2 (agent). His chat window can open plugins to view stock trade histories, checking account transactions, bank promotions to offer customers, etc. Incoming chat requests are routed to Bill as they come in from the bank website. As such, Bill has multiple available chat window plug-ins: B1-B100, C1-C100, U1-U100, X1-X100, depending on business logic based on interactions between B, C and U elements being present in the context. (i.e. if U1 and U2, then show plugin X1). When the start chat request is made (block 404), information is passed to the chat server 408 about the starting context (C1), the business process components available (B1, B3), and the user type (U1). This information is passed to the chat server 408 (block 406). The chat server 408 starts the chat between Lucy and Bill. Bill's chat window opens plug-ins associated with C1, B1, B3, and U2 (block 410), and also opens appropriate plug-ins on Lucy's device (block 412).

On the bank website various data elements are displayed to a customer, including account balance, and purchase details. On each purchase entry, an action to start a chat with a bank agent is provided. When the user starts a chat from the website, data is passed to the chat window of the bank agent from the purchase entry data object. This data instructs the chat window which specific application to open inside of the chat window, and opens a transaction history pane inside the chat window automatically. The data object also passes specific information about the individual transaction so that the transaction is shown in focus by the transaction history application. Based on the data from the purchase entry data object, the bank agent's transaction history application may disclose a late fee to be managed, and also display additional actions, forms, etc., for the bank agent to use to manage the late fee.

With reference now to FIG. 5, a flow chart of one or more exemplary steps taken by a computer to automatically extend a collaboration window is presented. After initiator block 502, an initiation of an interactive teleconference between two communication devices is detected (block 504). This interactive teleconference will utilize a collaboration window that is displayed on the two communication devices, such as a chat window. A topic for the interactive teleconference is then determined based on the starting context of the interactive teleconference (block 506). The starting context is specific to the topic/purpose/participants for the interactive teleconference. For example, assume that a party initiates the interactive teleconference from a smart phone (e.g., wireless device 154 shown in FIG. 1). Logic (e.g., SCL 148 shown in FIG. 1) in the receiving device (e.g., computer 102 shown in FIG. 1) can determine, based on the fact that the interactive teleconference was initiated from a smart phone (as determined by the fact that the call came in on a phone system) by a particularly identified user, that a record of that user's transactions will be needed by the receiving agent. This determination can be made by SCL 148 intuitively, since chat sessions from a smart phone are rarely to set up an account, pay bills, etc., but rather are to ask about a transaction, make a trade using an existing account, etc. If the chat session was initiated from a computer (as identified by the IP/MAC address and the fact that the session was initiated through an Ethernet connection), then the receiving device may determine that additional programs (e.g., for setting up a new account) may need to be automatically populating the receiving computer's chat window UI.

Similarly, the starting context may be defined according to which communication protocol was used to initiate the interactive teleconference. For example, a cell phone protocol (e.g., G4) message comes from a cell phone (e.g., wireless device 154 shown in FIG. 1), while a TCP/IP/HTTP message likely comes from a traditional computer (e.g., remote computer 152).

In one embodiment, the starting context is defined according to a particular website that was used to initiate the interactive teleconference. For example, if the chat session was initiated by a user utilizing a "help window" website of the service provider, then the receiving agent will need supporting information from an application related to help topics. This supporting information may also include data related to the chat session initiator, based on that user's identification information found in a header of the chat session request.

In one embodiment, the starting context is defined according to a particular communication channel used between the two communication devices to initiate the interactive teleconference. That is, a request coming in from an internal communication channel will trigger the extension of a chat window with different applications/information that those coming from an external communication channel. For example, if the chat session is initiated from an external communication channel (i.e., an Internet channel), then applications/information related to internal affairs (e.g., human resources) would not be necessary. However, if the chat session was initiated from an internal channel (e.g., a local area network), then such internal applications/information would be needed, and thus would auto-populate the chat window of the receiver of the chat session.

In one embodiment, the starting context is defined according to a role of an initiator of the interactive teleconference. In the same or another embodiment, the starting context is defined according to a role of a responder to the interactive teleconference. Based on these roles (which may or may not include the identities of the parties), the appropriate application/information is added to the chat window user interface. For example, if the person initiating the chat session is an enterprise member, and the person responding to the chat session is from human resources, then an application describing general human resource policies (e.g., vacation days, etc.) may be pulled up. If the system responding to the initiation of the chat session also knows who is initiating the chat session (based on header information, IP addresses, etc.), then that initiating party's employment records may be automatically pulled up and displayed on the computer used by the human resources party.

In one embodiment, the two communication devices used in the chat session include a first communication device and a second communication device, where the first communication device is behind a firewall. In this embodiment, the starting context may be defined according to whether or not the second communication device is behind the firewall. That is, if the initiator of the chat session is outside the firewall, then there may be a likelihood that certain internal/confidential information will not be needed during the chat session. However, if the initiator is behind the firewall, then such internal/confidential information may in fact be needed. Similarly, the starting context may be defined according to whether or not the communication channel used by the parties is secured by encryption.

As described in block 508, once the topic of the interactive teleconference is determined (based on the starting context), then that topic is associated with a related application that provides supporting information, and/or associated applications, related to the topic of the interactive teleconference. The supporting information may be data related to the topic, while the associated application(s) are applications that 1) display the supporting information or 2) do not display the supporting information, but are nonetheless relevant to the context (e.g., related websites, etc.). This supporting information and/or associated applications are then displayed on one or both of the communication devices (block 510). As described above, these applications/supporting information are 1) determined to be needed by one or both of the parties to the interactive teleconference (chat session); and 2) extend the chat window by being automatically displayed on one or both of the communication devices. The process ends at terminator block 512, which may be prompted by the termination of the interactive teleconference.

The present disclosure thus allows for built in intelligence, where potential starting points such as data objects can direct the automatic expression of plug-in applications, as well as pass data into those applications. This greatly enhances collaboration as it saves time for the members of a collaboration by establishing the appropriate work environment automatically from a unique context. It facilitates better integration of business process execution because it allows the data objects appearing in such processes to be configured in a way where they will set the appropriate stage for collaboration activities to take place involving them.

Note that the present disclosure enables the embedding of tools in a collaboration window even if the two parties to the interactive teleconference have no past history. That is, assume that a first user is on a company intranet, looking at a web page with various data and/or business process actions associated with the page. A chat session is then opened with a second user (at a different computer). Even if the two chat partners never have had any previous conversations, documents, or content history shared between them, the present disclosure can populate the chat screen with related data/applications based solely on the starting contexts (starting points) described herein. Thus, it is the starting context that establishes how the chat screen is extended, rather than any prior relationship between the two parties/users.

Note that in one embodiment of the present disclosure, relevant applications are embedded into an interactive screen. That is, whether data is shared or not, an application (which may or may not provide data) is shared (embedded) on the interactive screen viewed by one or both parties. For example, if two parties are discussing an issue that could be better understood with the use of a drawing application (to "whiteboard" the discussion), then this drawing application is opened up on both screens. If one party will better understand a question about a particular application that has been raised, then that application may populate the interactive window, in order to allow the confused party to get a look at the application, how it is laid out, access the help screen, etc. Thus, any application that is understood (e.g., by SCL 148 shown in FIG. 1), according to the starting context of the session, to be needed/useful to the session will be automatically pulled up and embedded into the interactive screen (e.g., chat window).

Note that while the present disclosure is described in exemplary manner in the context of a chat session, the extension of the collaboration window described herein may be used in any real time collaboration event. Exemplary real time collaboration events include, but are not limited to, chat sessions, e-meetings, and telephone call control.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer implemented method of automatically extending a collaboration window, the computer implemented method comprising:
    a processor detecting an initiation of an interactive teleconference between two communication devices, wherein the interactive teleconference is between two parties that have no history of prior communications between the two parties, wherein a starting context is independent of any history of prior communications between the two parties, wherein the two parties have never shared any documents or content history between the two parties, and wherein the interactive teleconference utilizes a collaboration window that is displayed on the two communication devices;
    the processor determining a topic of the interactive teleconference from the starting context of the interactive teleconference, wherein the starting context is defined according to a communication type used between the two communication devices and a role of one or more parties using the two communication devices;
    the processor associating the topic of the interactive teleconference with a related application, wherein the related application provides supporting information related to the topic of the interactive teleconference; and
    the processor automatically displaying the supporting information from the related application in the collaboration window on at least one of the two communication devices.

2. The computer implemented method of claim 1, further comprising:
    the processor determining that one of the communication devices is a cellular phone; and
    the processor, in response to determining that one of the communication devices is the cellular phone, determining that the topic of the interactive teleconference is an inquiry about a previous commercial transaction.

3. The computer implemented method of claim 1, further comprising:
    the processor determining that one of the communication devices is a desktop computer; and
    the processor, in response to determining that one of the communication devices is the desktop computer, determining that the topic of the interactive teleconference is related to setting up a new commercial account.

4. The computer implemented method of claim 1, further comprising:
    defining the starting context according to a particular website that was used to initiate the interactive teleconference.

5. The computer implemented method of claim 1, further comprising:
    defining the starting context according to a particular communication channel used between the two communication devices to initiate the interactive teleconference.

6. The computer implemented method of claim 1, further comprising:
    defining the starting context according to a role of an initiator of the interactive teleconference.

7. The computer implemented method of claim 1, further comprising:
    defining the starting context according to a role of a responder to the interactive teleconference.

8. The computer implemented method of claim 1, wherein the two communication devices comprise a first communication device and a second communication device, and wherein the first communication device is behind a firewall, the computer implemented method further comprising:
    defining the starting context according to whether or not the second communication device is behind the firewall.

9. The computer implemented method of claim 1, further comprising:
    defining the starting context according to whether or not the communication channel is secured by encryption.

10. The computer implemented method of claim 1, wherein the two communication devices comprise a first communication device and a second communication device, and wherein the computer implemented method further comprises:
    identifying a business process component required for the interactive teleconference;
    identifying a chat window plug-in used by the business process component; and
    populating, by an instruction from the second communication device, the chat window plug-in on the first communication device.

11. The computer implemented method of claim 1, wherein the interactive teleconference is a real time collaboration event.

12. The computer implemented method of claim 1, further comprising:
    the processor identifying the type of communication devices used in the interactive teleconference from the communication protocols used by the communication devices used in the interactive teleconference.

13. A computer program product for automatically extending a collaboration window, the computer program product comprising:
  a computer readable storage media;
  first program instructions to detect an initiation of an interactive teleconference between two communication devices, wherein the interactive teleconference is between two parties that have no history of prior communications between the two parties, wherein a starting context is independent of any history of prior communications between the two parties, wherein the two parties have never shared any documents or content history between the two parties, and wherein the interactive teleconference utilizes a collaboration window that is displayed on the two communication devices;
  second program instructions to determine a topic of the interactive teleconference from the starting context of the interactive teleconference, wherein the starting context is defined according to a communication type used between the two communication devices and a role of one or more parties using the two communication devices;
  third program instructions to associate the topic of the interactive teleconference with a related application, wherein the related application provides supporting information related to the topic of the interactive teleconference; and
  fourth program instructions to automatically display the supporting information from the related application in the collaboration window on at least one of the two communication devices,
and wherein the first, second, third, and fourth program instructions are stored on the computer readable storage media.

14. The computer program product of claim 13, further comprising:
  fifth program instructions to determine that one of the communication devices is a cellular phone; and
  sixth program instructions to, in response to determining that one of the communication devices is the cellular phone, determining that the topic of the interactive teleconference is an inquiry about a commercial transaction, and wherein the fifth and sixth program instructions are stored on the computer storage media.

15. The computer program product of claim 13, further comprising:
  fifth program instructions to define the starting context according to a particular website that was used to initiate the interactive teleconference, and wherein the firth program instructions are stored on the computer storage media.

16. A computer system comprising:
  a processor, a computer readable memory, and a computer readable storage media;
  first program instructions to detect an initiation of an interactive teleconference between two communication devices, wherein the interactive teleconference is between two parties that have no history of prior communications between the two parties, wherein a starting context is independent of any history of prior communications between the two parties, wherein the two parties have never shared any documents or content history between the two parties, and wherein the interactive teleconference utilizes a collaboration window that is displayed on the two communication devices;
  second program instructions to determine a topic of the interactive teleconference from the starting context of the interactive teleconference, wherein the starting context is defined according to a communication type used between the two communication devices and a role of one or more parties using the two communication devices;
  third program instructions to associate the topic of the interactive teleconference with a related application, wherein the related application provides supporting information related to the topic of the interactive teleconference; and
  fourth program instructions to automatically display the supporting information from the related application in the collaboration window on at least one of the two communication devices,
and wherein the first, second, third, and fourth program instructions are stored on the computer readable storage media for execution by the processor via the computer readable memory.

17. The computer system of claim 16, further comprising:
  fifth program instructions to define the starting context according to a particular communication channel used between the two communication devices to initiate the interactive teleconference, and wherein the fifth program instructions are stored on the computer storage media for execution by the processor via the computer readable memory.

18. The computer system of claim 16, further comprising:
  fifth program instructions to define the starting context according to roles of an initiator of and a responder to the interactive teleconference, wherein the fifth program instructions are stored on the computer storage media for execution by the processor via the computer readable memory.

19. The computer system of claim 16, wherein the two communication devices comprise a first communication device and a second communication device, and wherein the first communication device is behind a firewall, the computer system further comprising:
  fifth program instructions to define the starting context according to whether or not the second communication device is behind the firewall, and wherein the fifth program instructions are stored on the computer storage media for execution by the processor via the computer readable memory.

20. The computer system of claim 16, further comprising:
  fifth program instructions to define the starting context according to whether or not the communication channel is secured by encryption, and wherein the fifth program instructions are stored on the computer storage media for execution by the processor via the computer readable memory.

* * * * *